United States Patent [19]

Hettinga

[11] Patent Number: 6,060,005

[45] Date of Patent: *May 9, 2000

[54] LOW PRESSURE METHOD AND APPARATUS FOR INJECTION MOLDING A PLASTIC ARTICLE

[76] Inventor: Siebolt Hettinga, 2123 NW. 111th St., Des Moines, Iowa 50325

[ * ] Notice: This patent is subject to a terminal disclaimer.

[21] Appl. No.: 09/148,256

[22] Filed: Sep. 4, 1998

Related U.S. Application Data

[63] Continuation of application No. 08/925,553, Sep. 8, 1997, Pat. No. 5,853,630, which is a continuation of application No. 08/492,232, Jun. 19, 1995, abandoned.

[51] Int. Cl.[7] .................................................. B29C 45/77
[52] U.S. Cl. .................. 264/40.5; 264/40.7; 264/328.12; 264/328.13; 425/145; 425/147; 425/149; 364/475.05; 364/475.08
[58] Field of Search ................................ 264/40.1, 40.5, 264/40.7, 328.1, 328.12, 328.13; 425/145, 147, 149, 150; 364/475.05, 475.08

[56] References Cited

U.S. PATENT DOCUMENTS

| | | | |
|---|---|---|---|
| 5,102,587 | 4/1992 | Kumamura et al. | 264/40.1 |
| 5,336,073 | 8/1994 | Hiraoka | 425/145 |
| 5,340,297 | 8/1994 | Takizawa et al. | 425/145 |
| 5,817,258 | 10/1998 | Ito et al. | 264/40.1 |
| 5,853,630 | 12/1998 | Hettinga | 264/40.5 |
| 5,902,525 | 5/1999 | Hettinga | 264/40.1 |

OTHER PUBLICATIONS

Whelan, A., Injection Moulding Machines, pp. 364–366, 1984.

*Primary Examiner*—Jill L. Heitbrink
*Attorney, Agent, or Firm*—Brian J. Laurenzo; Michael C. Gilchrist

[57] ABSTRACT

A method for injecting a plastic material into a mold cavity to precisely fill the mold cavity under low pressure and to avoid packing the mold cavity with plastic material. The plastic material is injected into the mold cavity at a rate sufficient to maintain an unbroken melt front and to avoid any spraying or splashing of the plastic material within the mold cavity. After an initial unbroken melt front is established, the rate at which the material is injected is increased in proportion to the size of the melt front. After a predetermined amount of the material has entered the mold cavity, the material is injected based upon a rate-dominated control algorithm which maintains the unbroken melt front. Once the mold cavity has reached a pre-determined level of fill, the rate-dominated control algorithm is changed to a pressure-dominated control algorithm to prevent overrunning the end point of the mold process and to eliminate splashing and associated backflow problems. The injection pressure is monitored and controlled until the mold cavity has been precisely filled, at which time the injection pressure is maintained until the plastic article has hardened within the mold cavity. By filling the mold cavity exactly, the prior art problems associated with packing, such as warping and flash, are eliminated in the present invention and a more uniform product is produced from less material.

8 Claims, 5 Drawing Sheets

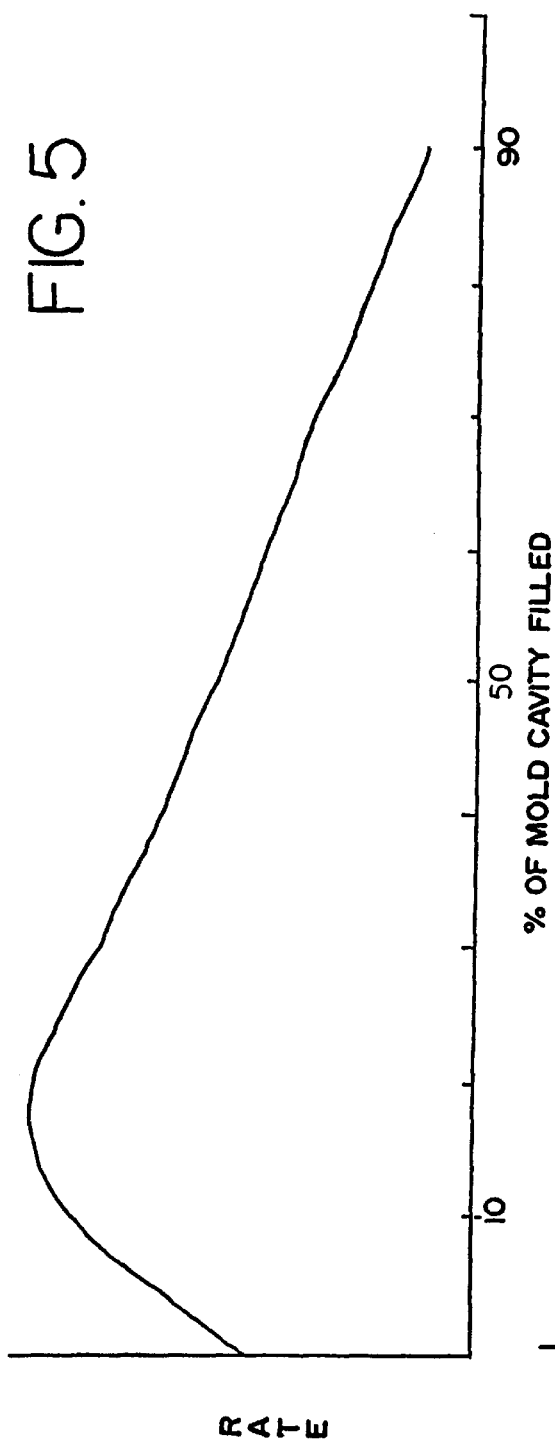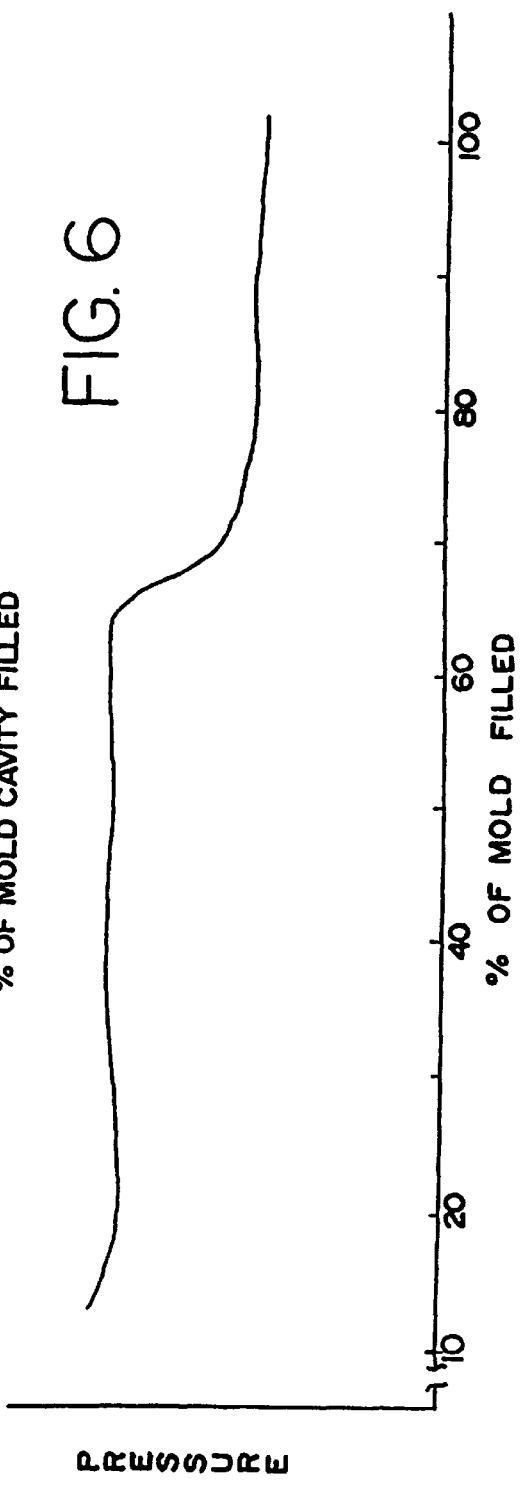

LOW PRESSURE METHOD AND APPARATUS FOR INJECTION MOLDING A PLASTIC ARTICLE

This application is a continuation of application Ser. No. 08/925,553 filed Sep. 8, 1997, now U.S. Pat. No. 5,853,630, which is a continuation of Application No. 08/492,232, filed Jun. 19, 1995, now abandoned.

BACKGROUND OF THE INVENTION

This invention relates to a method for molding a plastic article and, more particularly, to a method for molding a plastic article which uses incremental monitoring of the injection process without having to overpack the mold unit with plastic material.

Injection molding machines generally include a two-section mold unit wherein one of the mold sections is stationary and includes an end gate opening. The opening allows the injection of thermoplastic material into a cavity formed by the mold unit. The other mold section is generally movable between an open position away from the stationary mold section, and a closed position wherein the two mold sections are in sealed contact engagement to form the mold cavity.

Once the mold cavity has been formed, a reciprocating screw or similar injection device is used to inject a plastic material into the mold cavity where the material hardens with time. During injection of the plastic material, the mold unit is typically cooled. The cooling causes the plastic material to harden faster, so that the mold unit can be used to mold a greater number of plastic articles than if the mold unit were not cooled. As the plastic material is injected into the mold cavity, the leading edge of the plastic material forms a melt front which spreads across the mold cavity as the mold cavity fills. The plastic material, however, is typically injected into the mold cavity very quickly under high pressure to prevent the melt front from hardening too quickly and blocking the mold cavity. This high pressure injection breaks the smooth melt front and causes an erratic spray of plastic material into the mold cavity. Accordingly, instead of an unbroken symmetrical melt front evenly filling the mold cavity, the plastic material is sprayed throughout the mold cavity, thereby causing an asymmetrical filling of the cavity. This asymmetrical filling has the undesirable effect of preventing the plastic from filling every portion of the mold cavity. Additionally, as the plastic material is sprayed into the mold cavity, portions of the mold cavity are filled before others, leading to irregular hardening of the plastic material. A further problem with typical high pressure injection mold filling techniques is pressure needed to overcome such erratic filling of the mold cavity. Just as it is difficult to fill a glass of water completely with a high pressure hose, so too is it difficult to completely fill a mold cavity with high pressure injection techniques. As the cavity is filled, the plastic material begins to backflow, causing turbulence and requiring greater clamp pressures and injection pressures.

To overcome the asymmetrical filling and backflow associated with prior art processes, and to assure that the mold cavity becomes completely filled with plastic material, a volume of plastic material greater than the volume of the mold cavity is injected into the mold cavity and maintained under high pressure until the plastic begins to harden. The injection of an excess amount of material into the mold cavity requires a sharp pressure increase or "spike" to pack the material into the mold cavity. While "packing" the mold cavity with an excess of plastic material completely fills the mold cavity during the molding process, the pressure spike causes enormous outward pressure on the mold sections, leading to an increased amount of wear on the mold sections and clamping apparatus. Despite constructing mold units of steel to handle the pressure spikes associated with prior art molding processes, these mold units often wear prematively, requiring the mold units to be returned to the manufacturers for repair. Depending on the severity of the wear and the repair schedule of the manufacturers, worn mold units can be out of service for several weeks. The loss of production associated with the repair of cracked mold units is generally very costly.

The increased outward pressure on the mold sections may even lead to movement of the mold sections away from one another. When the mold sections move apart, plastic material seeps into the parting line between the mold sections. This "flash" is not only aesthetically undesirable on a finished plastic part, but also leads to a waste of material and creates an uneven parting line between the mold sections. As the clamping apparatus presses the mold sections together against the plastic hardening between the parting line, the parting line becomes deformed and uneven, thereby making flash even more likely upon subsequent moldings.

Additional problems associated with prior art high pressure molding techniques are the increased amount of material needed to be placed into the mold cavity, as well as the pressure gradients created throughout the molded part due to the increased amount of material being packed into a finite volume mold cavity. In some cases, the pressure gradient is so large that it leads to warpage of the finished plastic article. If the warpage is great enough, the plastic article may not fit within design tolerances.

While it would be desirable to fill the mold cavity slowly throughout the molding process, to avoid asymmetrical filling and backflow, it is difficult to inject the plastic material slowly without uneven curing and blockage within the cavity. If the mold cavity is filled too slowly, the first portion of the plastic material to be injected into the mold cavity begins to harden as the rest of the plastic material is still being injected. This premature hardening leads to clogging of the mold cavity during the filling process. Such clogging is particularly undesirable since it requires stopping a molding run and discarding the partially hardened materialThe The difficulties encountered in the prior art discussed hereinabove are substantially eliminated by the present invention.

SUMMARY OF THE INVENTION

It is an object of the present invention to provide a method for molding an injected plastic article which requires less clamping force than traditional plastic injection mold units.

Another object of the present invention is to provide a method for producing an injected plastic article without pressure gradients or warpage in the plastic article.

Yet another object of the present invention is to provide a method for molding an injected plastic article which reduces material costs in the molding process.

Still another object of the present invention is to provide a method for molding an injected plastic article which produces more uniform reproducible plastic articles.

Another object of the present invention is to provide a method for precisely filling a mold cavity of mold unit.

These and other objects of the invention will become apparent upon reference to the following specification, drawings, and claims.

By the present invention, it is proposed to overcome the difficulties encountered heretofore. To this end, a method for directing and controlling the operation of an injection molding machine in a manner which maintains an unbroken melt front is provided. A first mold section and a second mold section are provided, wherein the first mold section and the second mold section form a mold cavity for molding a plastic article when the second mold section is pressed into sealed engagement with the first mold section. To begin the molding process, the is second mold section is pressed into sealed engagement with the first mold section to form the mold cavity. An injection device is provided in operable engagement with the mold cavity and a plastic material is injected into the mold cavity with the injection device. The plastic material is injected at a rate which deposits the plastic material into the mold cavity with an unbroken melt front along a leading edge of the plastic material. The rate at which the plastic material is injected into the mold cavity is increased while the unbroken melt front along the leading edge of the plastic material is maintained. The pressure at which the plastic material is injected into the mold cavity is thereafter decreased before the mold cavity is completely filled with plastic material. This pressure reduction significantly reduces the amount of clamp pressure needed to keep mold halves together, but does not prevent the mold cavity from becoming completely filled.

In the preferred embodiment of the present invention, a variable volume, pressure compensated hydraulic pump is used to control the injection of the plastic material, while a central processing unit is operably connected to both the variable volume pressure compensated hydraulic pump and a shot size transducer to monitor the plastic material entering the mold cavity- Preferably, the plastic material within is placed within an injection device. The central processing unit triggers the injection device to inject the plastic material into the mold cavity with the injection being dictated by an initial rate-dominated control algorithm. Via the shot size transducer, the central processing unit monitors the amount of plastic material entering the mold cavity in increments of a predetermined size. The central processing unit increases the injection rate from the initial rate-dominated control algorithm to a faster, rate-dominated control algorithm. This increase in injection rate comes after approximately ten percent of the increments of plastic material have entered the mold cavity.

The central processing unit continues to monitor the number of increments of plastic material entering the mold cavity until approximately seventy percent of the increments have been injected into the mold cavity. At this time, the central processing unit triggers the injection device to inject the plastic material based upon a pressure-dominated control algorithm. The pressure-dominated control algorithm injects the plastic material into the mold cavity more slowly than the faster, rate-dominated control algorithm. The pressure reduction eliminates turbulence and allows the mold cavity to completely fill with plastic material, thereby eliminating the need for overpacking the mold cavity with plastic material.

DESCRIPTION OF THE DRAWINGS

FIG. 5 is a graphic representation of the injection rate during the molding process of the present invention; and FIG. 6 is a graphic representation of the injection pressure during the molding process of the present invention.

DETAILED DESCRIPTION OF THE INVENTION

Figure 2:
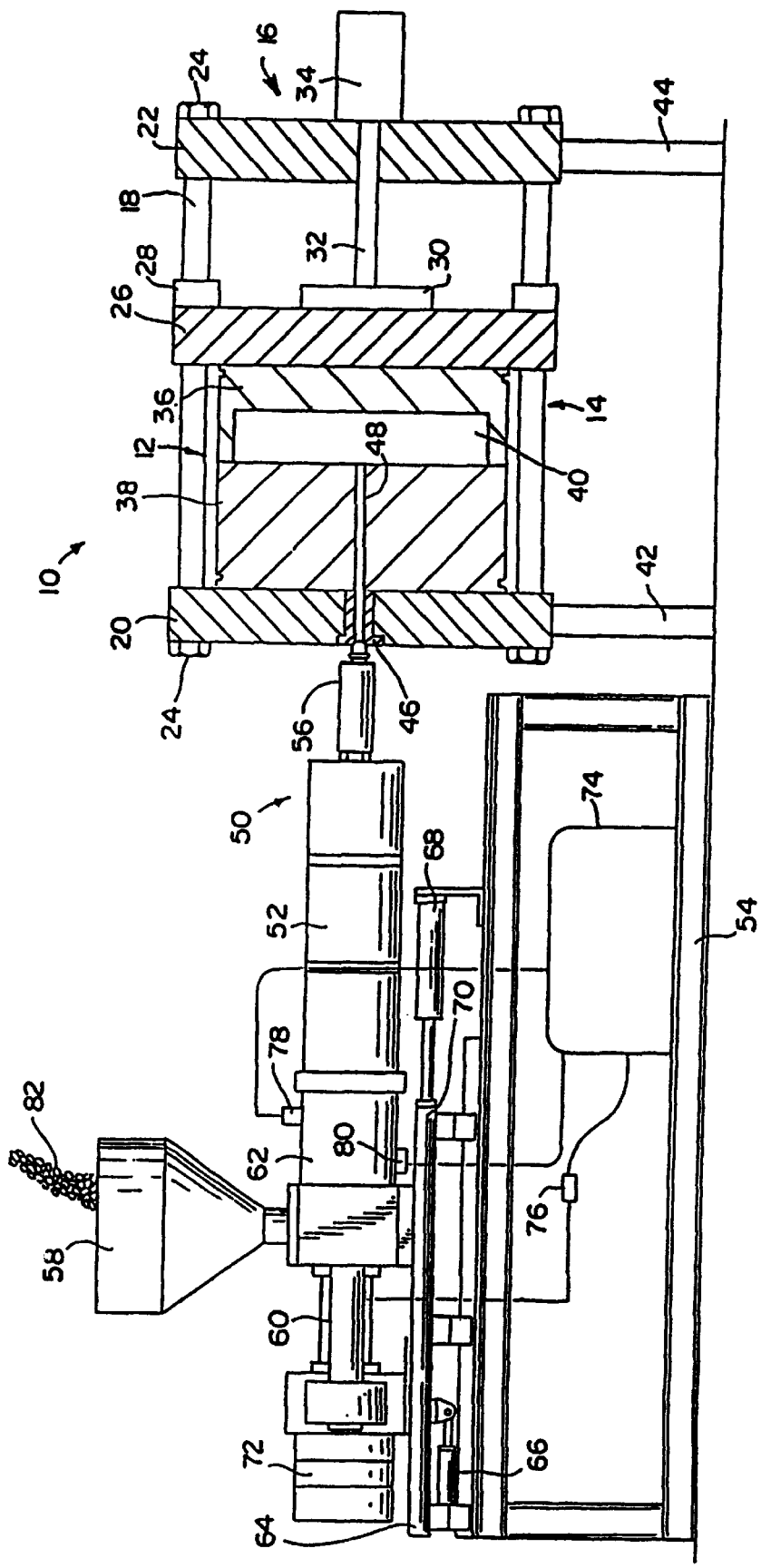
FIG. 2 is a side elevation of the molding apparatus of the present invention.

In the figures, a mold apparatus 10 is shown including a mold unit 12, a mold frame 14, and a hydraulic piston 16 (FIG. 2). The mold frame 14 consists of four cylindrical support bars 18 which are secured to a first plate 20 and a second plate 22 by means of nuts 24. A carriage 26 is slidably attached to the support bars 18 through bores which pass through the corners of the carriage 26. Support blocks 28 are provided with bores and mounted to the corners of the carriage 26 to add extra support to the carriage 26 as it slides along the support bars 18. A platen 30 is secured to the carriage 26 to evenly distribute force over the carriage 26. Secured to the platen 30 is a piston ram 32. The piston ram 32 passes through a bore in the center of the second plate 22 and is connected to a hydraulic cylinder 34. The hydraulic cylinder 34 and piston ram 32 make up the hydraulic piston 16.

Secured to the side of the carriage 26 opposite the platen 30 is a first mold section 36 which fits into sealed engagement with a second mold section 38 to form a mold cavity 40 (FIG. 2). The dimensions of the mold cavity 40 created by the first mold section 36 and second mold section 38 define the shape of the plastic article to be molded. The second mold section 38 is secured to the first plate 20 which, in turn, is secured to the mold frame support bars 18 of the mold frame 14. The first plate 20 is secured on a first pair of support legs 42 and the second plate 22 is secured on a second pair of support legs 44. The support legs 42 and 44 position the mold unit 12 at the proper height for the molding process.

Provided in the first plate 20 is an inlet sprue 46 which connects to a runner 48 provided in the first mold section 36 (FIG. 2). Because the present method uses slower injection than prior art methods, the size of the sprue 46 is preferably larger than sprues of the prior art. The larger sprue 46 allows a greater amount of plastic material 82 to enter the mold cavity 40 through the sprue 46. Unlike heated sprues of the prior art, the sprue 46 of the present invention is not required to be heated due to its increased size. The runner 48 allows plastic material to pass from the sprue 46 into the mold cavity 40.

Provided for operable engagement with the inlet sprue 46 is an injection assembly 50 which prepares and injects the plastic material 82 into the mold cavity 40 (FIG. 2). The injection assembly 50 is provided with an injection barrel 52 supported by a main frame 54. A nozzle unit 56 is mounted at one end of the injection barrel 52 and a hopper 58 is mounted to the top of the injection barrel 52. Positioned coaxially within the injection barrel 52 is a reciprocating screw 60 with attached flights (not shown) for plasticizing and moving the plastic material 82 toward the injection barrel 52 and nozzle unit 56. A variable volume, pressure compensated hydraulic pump 62 is secured to the injection barrel 52 and operates to move the injection screw 60 relative to the injection barrel 52 during the injection molding process. The injection assembly 50 is provided with a large rotational motor 72 which turns the injection screw 60 to plasticize the plastic injection material 82 before injection.

The nozzle unit 56 is movable into and out of operative association with the sprue 46 upon a reciprocal movement of a carriage 64 relative to the main frame 54. This reciprocal movement is responsive to the operation of a double acting cylinder 66 pivotally interconnected between the carriage 64 and the main frame 54. The operation of the double acting cylinder 66 is controlled by a linear actuator 68 mounted on the mainframe 54 for coacting engagement with a limit member 70 on the carriage 64.

The injection assembly 50 is operably coupled to a central processing unit 74 which monitors the progress of the injection process and feeds back responsive information regarding this progress to the injection assembly 50 (FIG. 2). In the preferred embodiment the central processing unit 74 is a personal computer, but the central processing unit 74 may, of course, be any system capable of monitoring the progress of a plastic injection run and controlling the injection in response thereto. To monitor the rate of plastic material injection, a shot size transducer 76 is coupled to the injection screw 60 to monitor the distance that the injection screw 60 travels. The shot size transducer 76 is a linear actuator which correlates movement of the injection screw 60 to a predetermined amount of the plastic material injected into the mold cavity 40. As each incremental amount of plastic material within the injection assembly 50 is injected into the mold cavity 40, the shot size transducer 76 monitors the associated incremental movement of the injection screw 60. Preferably the shot size transducer 76 measures increments of plastic material of one gram or less, which translates into approximately four thousand increments for a typical molding operation.

To monitor the pressure at which plastic material is injected into the mold cavity 40, a pressure monitor 78 is operably coupled to the hydraulic pump 62 (FIG. 2). The pressure monitor 78 is also coupled to the central processing unit 74. The central processing unit 74 is operably coupled to an injection control 80 which is, in turn, coupled to the hydraulic pump 62 to manipulate the injection of the plastic material 82.

To begin the molding process, the first mold section 36 is pressed into sealed engagement with the second mold section 38 by the hydraulic piston 16 (FIG. 2). Once the mold sections 36 and 38 have been pressed into sealed engagement to form the mold cavity 40, the double acting cylinder 66 moves the nozzle unit 56 of the injection assembly 50 into engagement with the injection sprue 46. The plastic material 82 is deposited into the hopper 58 and the reciprocating screw 60 is revolved with the motor 72 to plasticize the plastic material 82 and to transfer the plastic material 82 from the hopper 58 into the injection barrel 52. The reciprocating screw 60 is operably coupled to a variable back pressure relief valve which is well known in the art (not shown). Commands sent to the relief valve by the central processing unit 74 during the plasticization stage determine the condition of the plastic material 82, increment by increment before it is injected into the molding cavity 40.

Figure 4A:
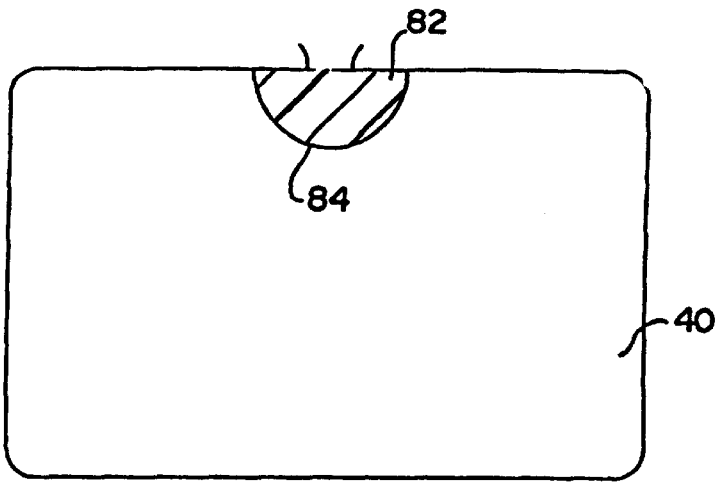
FIGS. 4a–c are top plan views of the mold cavity of the present invention in partial cross-section, showing the progress of plastic material through the mold cavity.

When the injection barrel 52 is filled with properly plasticized plastic material 82, the hydraulic pump 62 pushes the reciprocating screw 60 toward the nozzle unit 56. The plasticized plastic material 82 is thereby transferred from the injection barrel 52 into the sprue 46 and runner 48. From the runner 48, the plastic material 82 enters the mold cavity 40 (FIGS. 2 and 4*a*). The first mold section 36 and second mold section 38 are preferably maintained at a constant temperature to prevent the plastic material 82 from prematurely hardening on the walls of the mold cavity 40. This is in direct contravention of prior art methods which teach significantly cooling the mold section to speed hardening and thereby increase production rates.

Figure 3A:
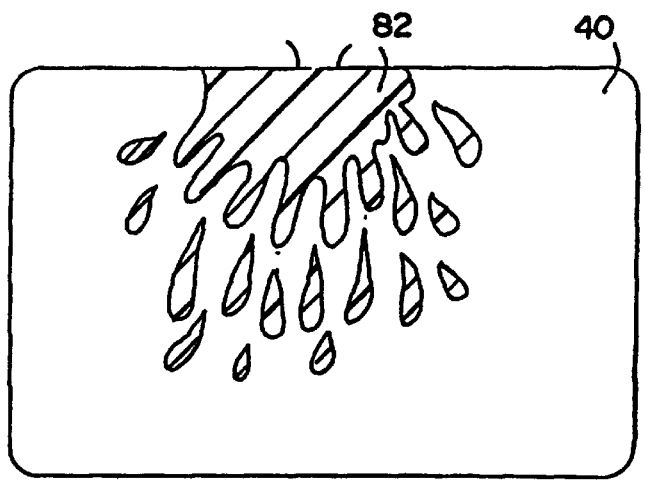
FIGS. 3a–c are top plan views of a prior art mold cavity in partial cross-section, showing the progress of plastic material through the mold cavity.
Figure 3B:
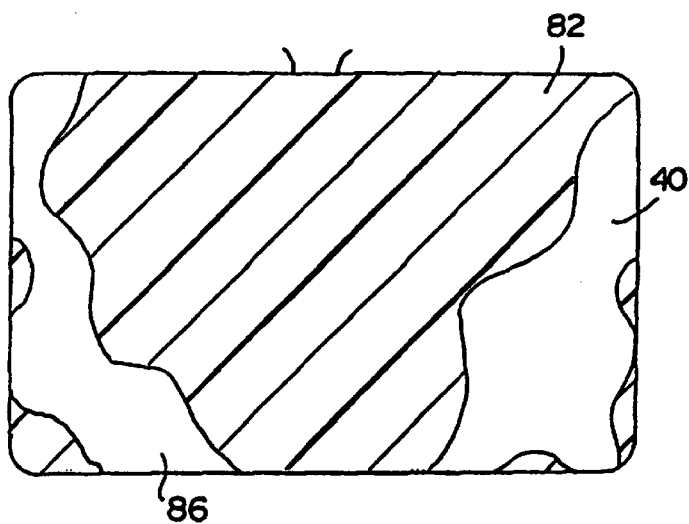
Figure 3C:
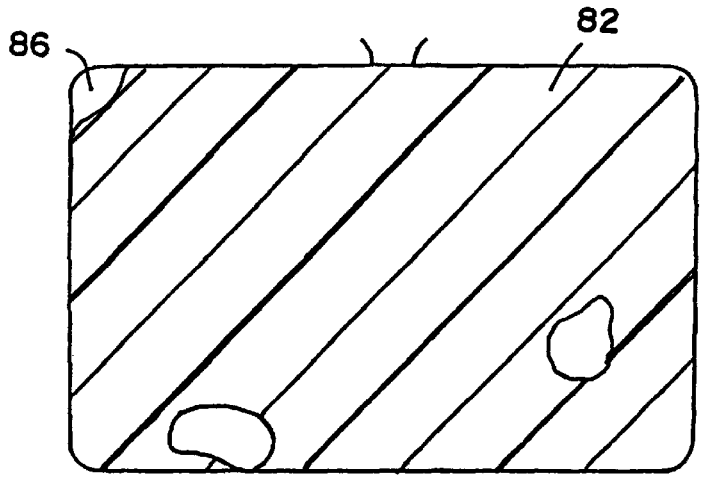

Initial injection of the plastic material 82 into the mold cavity 40 is at a predetermined rate which is greatly reduced from prior art methods. Prior art methods splatter the plastic material 82 throughout the mold cavity 40 which leads to undesirable unfilled voids. In the present method the predetermined rate is sufficiently slow to allow the plastic material 82 to enter the mold cavity 40 with an unbroken melt front 84 as shown in FIG. 4*a*. This pre-determined initial injection rate may be determined by trial and error. If the initial injection rate is too high, the plastic material 82 entering the mold cavity 40 splatters as shown in FIG. 3*a*. This splattering is a result of high pressure injection used in the prior art, and results in asymmetrical filling of the mold cavity as shown in FIGS. 3*b* and 3*c*. The asymmetrical filling leads to a mold cavity 40 with various unfilled portions 86 as shown in FIGS. 3*b*–*c*. Since these unfilled portions 86 are scattered randomly about the mold cavity 40, it is not possible to fill these portions 86 merely by adding more plastic material 82 at the previous rate.

To overcome this partial nonfilling problem, prior art processes "pack" an excess amount of plastic material 82 into the mold cavity 40 under extremely high pressure. This high pressure causes excessive strain on the clamping unit and creates finished parts that have hardened with internal pressure gradients. The pressure gradients may lead to warpage of the finished product and may, in extreme circumstances, cause the plastic article to be discarded as unusable. The high pressure also leads to "flashing" whereby material seeps between the mold sections during the molding process. This "flash," apparent on some prior art products, is caused when the extreme pressure developed during the packing phase forces the mold sections slightly apart enough so that the plastic material can seep along the parting line. As the plastic hardens, the finished plastic article is left with a ridge of hardened plastic along the parting line of the mold unit. In addition to being undesirable and wasteful, over time this flash can lead to premature wear of the mold sections as the clamp attempts to push the mold sections together against the hardened plastic.

In the preferred embodiment of the present method, movement of the mold sections 36 and 38 relative to one another is monitored by a human operator (not shown) and corrections manually inputed. By observing the mold sections 36 and 38 over a series of molding runs, the operator can program the central processing unit 74 to decrease the injection pressure enough to just fill the mold cavity 40 without causing flash or undue pressure within the mold cavity 40. Alternatively, software may be written so that the central processing unit 74 automatically "observes" movement of the mold sections 36 and 38 via a linear transducer (not shown) and adjusts the final injection pressure until the desired injection pressure is achieved.

As shown in FIG. 4*a*, as the plastic material 82 enters the mold cavity 40, an initial unbroken melt front 84 is formed within the mold cavity 40 (FIGS. 2 and 4*a*). To determine the initial rate of injection, the movement of the shot size transducer 76 is correlated against time of injection by the central processing unit 74. Since the shot size transducer 76 is correlated to monitor the injection of the plastic material 82 into the mold cavity 40 in increments of one gram or less, the shot size transducer 76 detects incremental movements of the reciprocating screw 60 and transfers this information to the central processing unit 74 for each increment of plastic material that is injected into the mold cavity 40.

Figure 4B:
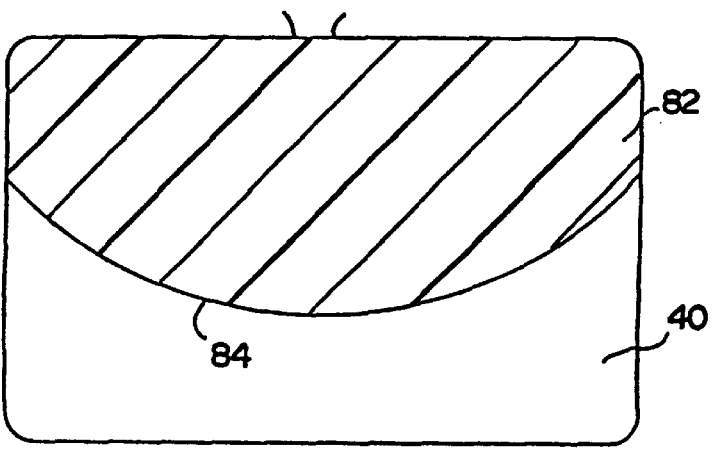

During the injection process, it is advantageous to maintain the melt front intact to avoid splattering and asymmetrical filling of the mold. As more material is injected into the mold cavity 40, the melt front 84 grows larger as shown in FIG. 4b. As the melt front 84 gains a larger and larger surface area, the plastic material 82 may be injected into the mold cavity 40 at a higher rate without causing the melt front 84 to break. The increased injection rate will not increase the actual pressure along any particular point of the melt front 84 as long as the injection rate is increased no faster than the rate at which the surface area of the melt front 84 grows.

Figure 1:
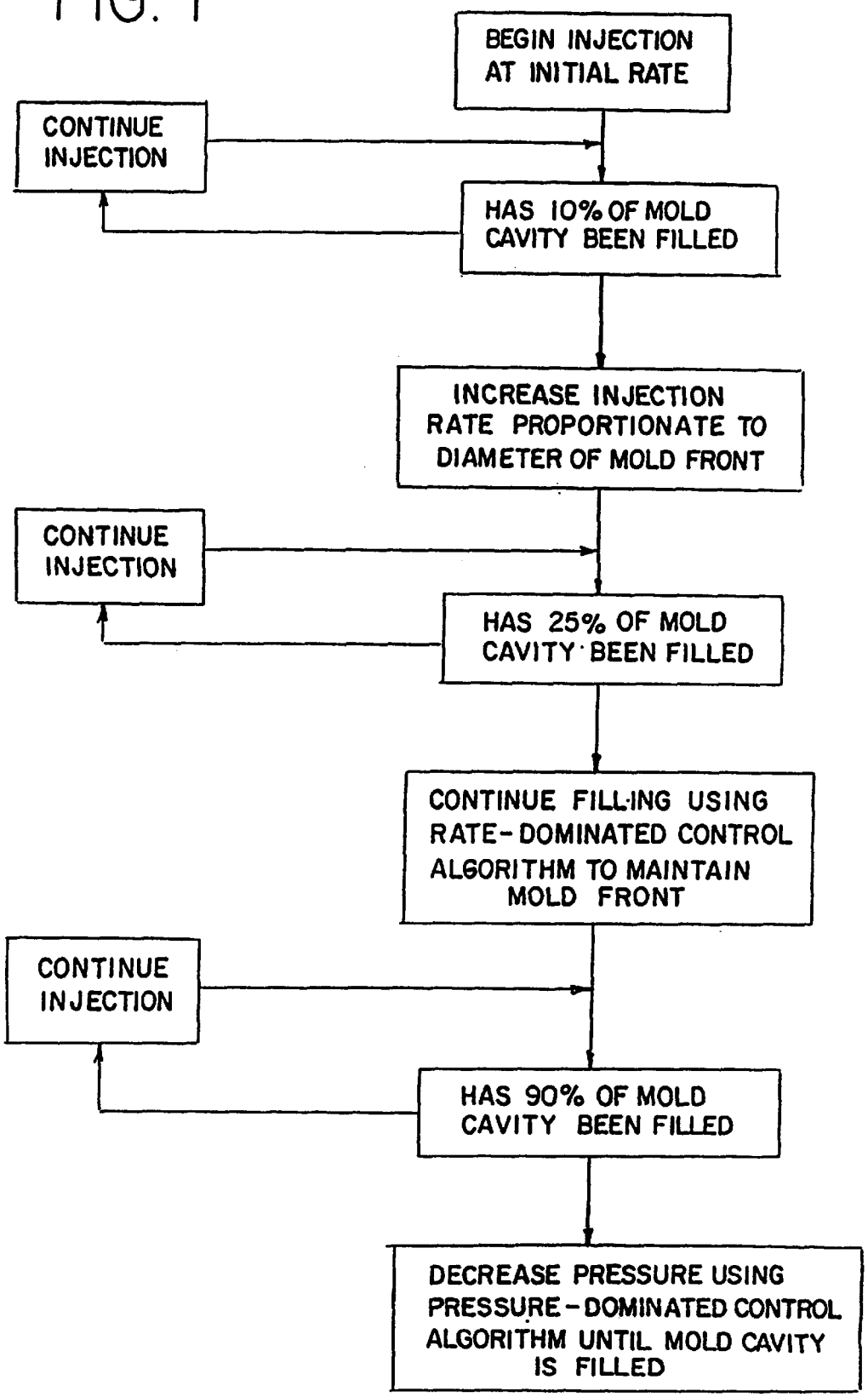
FIG. 1 is a flow chart showing the method of the present invention.

As shown in FIG. 1 the plastic material 82 is injected into the mold cavity 40 at an initial pre-determined injection rate until the central processing unit 74 receives information from the shot size transducer 76 that ten percent of the one gram increments of the plastic material 82 have been injected into the mold cavity 40 (FIGS. 1, 2, and 4a). Once ten percent of the increments have been injected, the central processing unit 74 triggers the injection control 80 to increase the injection rate in proportion to the amount of plastic material 82 which has been injected into the mold cavity 40. Because the surface area of the melt front 84 at any given time is roughly proportionate to the amount of plastic material 82 which has been injected into the mold cavity 40, increasing the injection rate in proportion to the amount of plastic material 82 injected into the mold cavity 40 results in an increase in the rate of injection which is proportionate to the surface area of the melt front 84. It should be noted that the increase may be initiated after between about two percent and fifty percent of the plastic material 82 has been injected into the mold cavity 40.

The injection rate is increased in proportion to the surface area of the melt front 84 until twenty percent of the increments of the plastic material 82 have been injected into the mold cavity 40 (FIGS. 1, 2, and 4). Increasing the injection in proportion to the surface area of the melt front indefinitely, however, would lead to an undesirably high injection rate which would be too difficult to slow. Accordingly, after twenty percent of the increments of the plastic material 82 have been injected into the mold cavity 40, the injection is continued using a rate-dominated control algorithm to maintain the melt front 84 at a desirable injection rate. As shown in FIG. 5, in the preferred embodiment of the present process, the injection rate is increased until approximately twenty percent of the mold cavity is filled, at which time the injection rate is steadily reduced until the mold cavity 40 is approximately seventy percent filled. The rate-dominated control algorithm may be initiated any time after the increase in injection rate has begun and is preferably discontinued before ninety-five percent of the mold cavity 40 is filled. The exact rate-dominated algorithm controlling the rate at which the plastic material 82 is injected into the mold cavity 40 is not of critical importance, and may be customized to provide desirable filling characteristics based upon a mold flow analysis of the particular mold cavity 40. It is desirable, however, as shown in FIG. 5, to begin reducing the rate of injection well before the mold cavity 40 has become ninety-five percent filled, to avoid undesirable backflow and splashing as the mold cavity 40 is filled to capacity.

At any time during the injection of the increments of the plastic material 82 10 into the mold cavity 40, where the pressure required exceeds the requested pressure, the central processing unit 74 can trigger the injection control 80 to inject the plastic material 82 based upon a pressure-dominated control algorithm, rather than the rate-dominated control algorithm used to inject the majority of the plastic material 82. The pressure-dominated control algorithm reduces the pressure at which the plastic material 82 is injected into the mold cavity 40 to prevent the backflow and turbulence associated with the prior art methods. Because the prior art makes no correlations between injection pressure and the speed at which the plastic material 82 fills the mold cavity 40, there is no way to anticipate the endpoint for the filling of the mold cavity 40. Therefore, in prior art techniques, there is no way to accurately reduce the pressure to prevent turbulence and backflow. Indeed, the prior art methods actually increase the ending pressure to force an overflow amount of plastic material into the mold cavity.

Figure 4C:
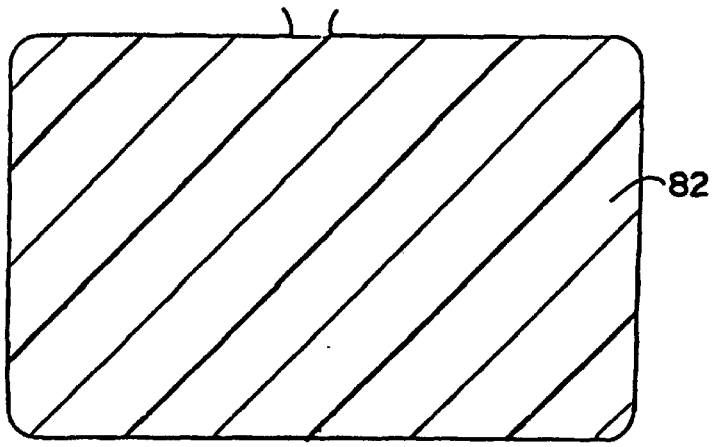

Like the rate-dominated control algorithm, the pressure-dominated control algorithm of the present method can be determined based upon mold flow characteristics of the particular mold cavity 40 and initiated any time after the rate-dominated control algorithm has been initiated, but is preferably initiated after fifty percent of the increments of the plastic material 82 have been injected into the mold cavity 40. The central processing unit 74 receives input from the pressure monitor 78 to maintain a pressure on the plastic material 82. Preferably this pressure is sufficient to completely fill the mold cavity 40, without causing the plastic material 82 to splash, or the melt front 84 to break before the mold cavity 40 is filled (FIGS. 2 and 4c).

As shown in FIG. 6, the pressure is manipulated to prevent any aberrations in the melt front 84 during the last portion of the injection process. As shown in FIG. 4c, the present method evenly fills the entire mold 40, thereby eliminating the need for prior art "packing" techniques required to fill unfilled portions 86 produced by excessive injection rates and broken melt fronts (FIG. 3c). The central processing unit 74 triggers the injection control 80 to cease injection of plastic material 82 into the mold cavity 40 at the proper point to fill the mold cavity 40 exactly. By providing the mold cavity 40 with precisely the amount of plastic material 82 that is needed to fill the mold cavity 40, there is a material savings over prior art packing processes. The central processing unit 74 preferably coordinates the size of the shot with the rate-dominated injection and the pressure-dominated injection to achieve the proper balance between rapid and accurate fillings of the mold cavity 40.

Near the end of the molding cycle in prior art processes, there is a pressure spike when the plastic material reaches the end of the mold cavity and begins to backflow. This pressure is returned back to the injection gate and requires large amounts of clamping force to maintain the mold sections together against this end pressure. As this pressure is spread throughout the plastic material during the hardening process, the finished part often has molded-in stress which may weaken or discolor the part. Because packing is eliminated in the present invention, less clamping force is required to maintain the mold cavity 40 during the mold process and molded in stress is reduced. Whereas two and one-half to three tons of clamp pressure per square inch may be required to hold the mold sections together in a prior art molding operation, one-half to one ton of clamp pressure per square inch may be used in molding a similar part by the present method.

Since the present method eliminates the pressure spike at the end of the molding process, less strength is required of the mold sections 36 and 38. Accordingly, lighter weight aluminum may be used to make the mold sections. Additionally, prior art molding machines with pressure related fractures of their steel mold sections may be retro-fitted with the aluminum mold sections 36 and 38 of the present invention. This allows the molding machine to be quickly returned to operation using the present inventive method. The reduction in clamping force also allows the use of cheaper, lighter, and smaller clamps. Furthermore, because the stress on the mold sections 36 and 38 is reduced, there is less chance of failure of the mold sections of the present invention and therefore less chance of the accompanying costly downtime.

Once the mold cavity 40 is filled, the plastic material 82 is allowed to harden within the mold cavity 40 (FIGS. 2 and 4c). After the plastic material 82 has hardened, the hydraulic piston 16 is actuated to move the movable mold section 36 away from the stationary mold section 38 so that the hardened plastic material 82 may be removed from the mold apparatus 10. Because the present invention eliminates the excessive prior art pressures during the hardening phase, the resulting plastic article is free of pressure gradients and warpage. This allows the present invention to produce a more uniform, reproducible plastic article.

In the preferred embodiment, the rate dominated control and the pressure-dominated control algorithms work together throughout the entire shot where the rate-dominated control algorithm is the leading factor and the pressure-dominated control algorithm is used as an upper limit. At the point during the injection cycle where the pressure required by the rate-dominated control algorithm reaches the upper limit of the pressure-dominated control algorithm, the pressure dominated control algorithm takes over to finish the injection stroke. Accordingly, the algorithm of the preferred embodiment would be as follows:

Injection
Actual Requested Pressure
Injection=Injection While Actual Is less than Limit
Rate Rate Pressure Set Point
else
Injection
Actual Pressure
Injection Decreases to Prevent Actual From Limit
Rate Pressure Exceeding Set Point The foregoing description and drawings merely explain and illustrate the invention. The invention is not limited thereto, except insofar as the claims are so limited, as those skilled in the art who have a disclosure before them will be able to make modifications and variations therein without departing from the scope of the invention. For example, it is anticipated to be within the scope of the invention that fabric may be maintained against one or both of the mold sections 36 and 38 during the molding process to provide a finished plastic article with a molded-in fabric covering. The large sprue 46 and slow injection of the present invention decrease the incidences of wrinkling or tearing the fabric over prior art methods. It is also anticipated that the aforesaid points for beginning the rate-dominated control algorithm and switching to the pressure-dominated control algorithm may be manipulated to exploit specific characteristics of a particular mold cavity mold flow analysis.

What is claimed is:

1. A method for molding a plastic article in a mold cavity comprising:
   determining whether the pressure within the mold cavity reaches a predetermined pressure;
   injecting the plastic material into the mold cavity according to a rate-dominated algorithm if the pressure within the mold cavity is below the predetermined pressure; and
   injecting the plastic material into the mold cavity according to a pressure-dominated algorithm after the pressure within the mold cavity reaches the predetermined pressure;
   wherein the rate of injection of plastic material injected according to the rate-dominated and pressure-domninated control algorithms is time-varying.

2. The method of claim 1, wherein the plastic material is injected at an initial fixed injection rate prior to being injected according to the rate-dominated algorithm.

3. A method for molding an article in a mold cavity comprising:
   dividing an amount of plastic material into a plurality of substantially equal increments;
   injecting a first number of increments into the mold cavity at an initial injection rate such that the plastic materials forms an unbroken melt front having a face;
   after the injection of the first number of increments, increasing the initial injection rate in proportion to the size of the face of the melt front until a second number of increments of the plastic material have been injected into the mold cavity;
   after the injection of the second number of increments, injecting the plastic material into the mold cavity using a rate-dominated control algorithm until a third number of increments have been injected into the mold cavity; and
   after the injection of the third number of increments, injecting the plastic material into the mold cavity using a pressure-dominated control algorithm.

4. A mold apparatus comprising:
   (a) a mold cavity;
   (b) an injection assembly operably connected to the mold cavity for injecting a plastic material into the mold cavity;
   (c) a central processing unit operably connected to the injection assembly;
   wherein the central processing unit is for implementing a rate-dominated control algorithm and a pressure-dominated control algorithm and for causing the injection assembly to inject the plastic material into the mold cavity according to the rate-dominated and pressure-dominated control algorithms such that while the rate-dominated and pressure-dominated control algorithms are implemented, the rate of injection of the plastic material is time-varying.

5. The mold apparatus of claim 4, wherein the mold cavity is formed by a first mold section and second mold section pressed in sealed engagement.

6. The mold apparatus of claim 4, wherein the injection assembly comprises a rotatable injection screw revolvably controlled by the central processing unit for injecting the plastic material into the mold cavity.

7. The mold apparatus of claim 4 further comprising a pressure monitor for monitoring the pressure within the mold cavity and causing the central processing unit to cause the injection assembly to inject the plastic material into the mold cavity according to the pressure-dominated algorithm when the pressure within the mold cavity reaches a predetermined pressure.

8. The mold apparatus of claim 4 further comprising a transducer operably connected to the central processing unit and the injection assembly for monitoring the rate of injection of the plastic material.

* * * * *